United States Patent [19]

Hoffa

[11] Patent Number: 5,456,148
[45] Date of Patent: * Oct. 10, 1995

[54] WIRE AND CABLE DRIVE APPARATUS IN WIRE AND CABLE CUTTING AND STRIPPING SYSTEM

[75] Inventor: Jack L. Hoffa, Brea, Calif.

[73] Assignee: Eubanks Engineering Company, Monrovia, Calif.

[*] Notice: The portion of the term of this patent subsequent to Apr. 6, 2010 has been disclaimed.

[21] Appl. No.: 149,221

[22] Filed: Nov. 8, 1993

Related U.S. Application Data

[63] Continuation-in-part of Ser. No. 22,981, Feb. 25, 1993, Pat. No. 5,375,485, which is a continuation-in-part of Ser. No. 857,972, Mar. 26, 1992, Pat. No. 5,293,683, which is a continuation-in-part of Ser. No. 659,557, Feb. 22, 1991, abandoned, which is a continuation-in-part of Ser. No. 611,057, Nov. 9, 1990, Pat. No. 5,146,673.

[51] Int. Cl.$^6$ .................................................. H02G 1/12
[52] U.S. Cl. ........................... 83/155; 81/9.51; 83/424; 83/947; 198/626.4
[58] Field of Search ............. 81/9.51; 198/626.4, 198/626.5, 626.6; 226/172, 177, 187; 83/947, 424, 155

[56] References Cited

U.S. PATENT DOCUMENTS

| | | |
|---|---|---|
| 1,433,320 | 10/1922 | Wersel . |
| 1,477,678 | 12/1923 | Wetmore . |
| 2,523,936 | 9/1950 | Axelsen . |
| 2,645,959 | 7/1953 | Fuchs et al. . |
| 2,671,363 | 3/1954 | Wells . |
| 2,722,145 | 11/1955 | Schulenburg . |
| 2,765,685 | 10/1956 | Stratman et al. . |
| 2,811,063 | 10/1957 | Eubanks . |
| 2,880,635 | 4/1959 | Harris . |
| 2,934,982 | 5/1960 | Eubanks . |
| 3,176,550 | 4/1965 | Marcotte . |
| 3,222,957 | 12/1965 | Kramer et al. . |
| 3,292,462 | 12/1966 | Turecek et al. . |
| 3,309,948 | 3/1967 | Falken . |
| 3,316,781 | 5/1967 | Bignall et al. ........................ 81/9.51 |
| 3,368,428 | 2/1968 | Gudmestad . |
| 3,376,627 | 4/1968 | Sitz . |

(List continued on next page.)

FOREIGN PATENT DOCUMENTS

| | | |
|---|---|---|
| 2525402 | 4/1982 | France . |
| 2525403 | 7/1984 | France . |
| 2513478 | 2/1985 | France . |
| 1084799 | 7/1960 | Germany . |
| 2927235 | 8/1980 | Germany . |
| 0423443 | 7/1990 | Germany . |
| 3926782 | 12/1990 | Germany . |
| 1216815 | 3/1986 | U.S.S.R. . |
| 1293779 | 2/1987 | U.S.S.R. . |
| 609834 | 10/1948 | United Kingdom . |

OTHER PUBLICATIONS

Standard Logic Catalogue, "EWS–6K Electronic Wire Stripper", Feb. 1974.
Artos Catalog Sheet, "Single Blade, Fully–Automatic Wire Processing", 1989. (month unknown).
Komax 33 Catalogue Sheet, 1988. (month unknown).

*Primary Examiner*—Kenneth E. Peterson
*Attorney, Agent, or Firm*—William W. Haefliger

[57] ABSTRACT

An apparatus for processing wire comprising conveyor structure for displacing the wire endwise, the conveyor structure including first upper and lower endless conveyors engageable with opposite sides of the wire; and first upper and lower assemblies for carrying and controllably driving the conveyors; there being frame structure, including guide structure on which the assemblies are supported and guided for movement toward and away from one another; there being timing belts operatively connected with the assemblies to transmit drive to the conveyors via the assemblies, in different positions of the assemblies associated with the relative movement thereof. Wires of different diameters may be advanced by the conveyors while the same axis of wire travel is maintained.

25 Claims, 4 Drawing Sheets

U.S. PATENT DOCUMENTS

| | | |
|---|---|---|
| 3,479,718 | 11/1969 | Van De Kerkhof et al. . |
| 3,552,449 | 1/1971 | Woodward et al. . |
| 3,570,100 | 3/1971 | Kindell et al. . |
| 3,604,291 | 9/1971 | Weidner . |
| 3,610,500 | 10/1971 | Brown .................................................. 226/172 |
| 3,612,111 | 10/1971 | Meyer . |
| 3,614,905 | 3/1969 | Bieganski . |
| 3,645,156 | 2/1972 | Meyer et al. . |
| 3,653,412 | 4/1972 | Gudmestad . |
| 3,701,301 | 10/1972 | Gudmestad . |
| 3,769,681 | 11/1973 | Eubanks . |
| 3,838,612 | 10/1974 | Inami . |
| 3,857,306 | 12/1974 | Gudmestad . |
| 3,857,313 | 12/1974 | Endo . |
| 3,869,781 | 3/1975 | Eubanks et al. . |
| 3,872,584 | 3/1975 | Chick et al. . |
| 3,881,374 | 5/1975 | Gudmestad . |
| 3,918,330 | 11/1975 | Blaha . |
| 3,921,472 | 11/1975 | Gudmestad et al. . |
| 3,927,590 | 12/1975 | Gudmestad et al. . |
| 3,946,918 | 3/1976 | Babbin et al. ....................... 226/172 |
| 4,009,738 | 3/1977 | Baba et al. . |
| 4,027,557 | 6/1977 | Stepan . |
| 4,091,695 | 5/1978 | Funcik et al. . |
| 4,099,428 | 7/1978 | Senior et al. ....................... 81/9.51 |
| 4,112,791 | 9/1978 | Wiener . |
| 4,156,961 | 6/1979 | Agoh . |
| 4,164,808 | 8/1979 | Gudmestad et al. . |
| 4,165,768 | 8/1979 | Gudmestad . |
| 4,166,315 | 9/1979 | Gudmestad et al. . |
| 4,175,316 | 11/1979 | Gudmestad . |
| 4,194,281 | 3/1980 | Gudmestad . |
| 4,238,981 | 12/1980 | Karl . |
| 4,244,101 | 1/1981 | Talley . |
| 4,261,230 | 4/1981 | Sindelar . |
| 4,266,455 | 5/1981 | Ago . |
| 4,275,619 | 6/1981 | Shimizu . |
| 4,327,609 | 5/1982 | Resch . |
| 4,350,061 | 9/1982 | Isham et al. . |
| 4,364,289 | 12/1982 | Sorensen . |
| 4,370,786 | 2/1983 | Butler . |
| 4,403,383 | 9/1983 | Dewhurst et al. . |
| 4,428,114 | 1/1984 | Teagno . |
| 4,446,615 | 5/1984 | Talley . |
| 4,493,233 | 1/1985 | Dusel et al. . |
| 4,502,586 | 3/1985 | Dusel et al. . |
| 4,521,946 | 6/1985 | Dusel et al. . |
| 4,543,717 | 10/1985 | Luka . |
| 4,581,796 | 4/1986 | Fukuda et al. . |
| 4,584,912 | 4/1986 | Gudmestad et al. . |
| 4,597,179 | 7/1986 | Goforth . |
| 4,601,093 | 7/1986 | Cope . |
| 4,631,822 | 12/1986 | Reinertz . |
| 4,638,558 | 1/1987 | Eaton . |
| 4,699,027 | 10/1987 | Guyette et al. ....................... 81/9.51 |
| 4,713,880 | 12/1987 | Dusel et al. . |
| 4,738,019 | 4/1988 | Kawaguchi . |
| 4,745,828 | 5/1988 | Stepan . |
| 4,802,512 | 2/1989 | Kodera . |
| 4,827,592 | 5/1989 | Kodera . |
| 4,833,778 | 5/1989 | Loustau . |
| 4,838,129 | 6/1989 | Cope . |
| 4,869,135 | 9/1989 | Hoffa . |
| 4,932,110 | 6/1990 | Tanaka . |
| 4,942,789 | 7/1990 | Hoffa et al. . |
| 5,016,347 | 5/1991 | Okazaki et al. . |
| 5,067,379 | 11/1991 | Butler et al. . |
| 5,109,598 | 5/1992 | Koch . |
| 5,142,950 | 9/1992 | Takano et al. . |
| 5,146,673 | 9/1992 | Hoffa . |
| 5,188,213 | 2/1993 | Koch . |
| 5,199,328 | 4/1993 | Hoffa ....................... 81/9.51 |
| 5,235,735 | 8/1993 | Koch . |
| 5,368,212 | 11/1994 | Koch . |

WIRE AND CABLE DRIVE APPARATUS IN WIRE AND CABLE CUTTING AND STRIPPING SYSTEM

This application is a continuation-in-part of Ser. No. 08/022,981 filed Feb. 25, 1993, now U.S. Pat. No. 5,375,485, which is a continuation-in-part of Ser. No. 07/857,972 filed Mar. 26, 1992, now U.S. Pat. No. 5,293,683, which is a continuation-in-part of Ser. No. 07/659,557 filed Feb. 22, 1991, now abandoned, which is a continuation-in-part of Ser. No. 07/611,057 filed Nov. 9, 1990, now U.S. Pat. No. 5,146,673 issued Sep. 15, 1992.

This application relates generally to controllable endwise transport of wire or cable, as for example for wire or cable severing, as well as stripping sheathing from severed wire. More particularly, it concerns unusually advantageous apparatus and method effecting such controlled endwise transport of wire or cable.

There is continual need for equipment capable of severing wire or cable into sections, and also capable of rapidly and efficiently stripping sheathing off ends of those sections. It is desirable that these functions be carried out as a wire or cable travels along generally the same axis, i.e., progresses forwardly, and that multiple wire and cable sections of selected length be produced, each having its opposite ends stripped of sheathing, to expose bare metal core wire at each end.

More generally, there is need for very simple, effective, and reliable apparatus to controllably drive wire or cable to and from work stations at which wire or wire end portions are processed, and with minimum power requirements. Provision for means to enable different size wires to have the same endwise travel center line is also needed. The word "wire" herein will be used to designate wire or cable.

SUMMARY OF THE INVENTION

It is a major object of the invention to provide improved apparatus meeting the above need. Basically, the apparatus includes:

a) conveyor means for displacing the wire endwise, the conveyor means including first upper and lower endless conveyors engageable with opposite sides of the wire, b) and first upper and lower assemblies for carrying and controllably driving the conveyors, c) there being frame means including guide means on which the assemblies are supported and guided for movement toward and away from one another, d) there being timing belts operatively connected with the assemblies to transmit rotary drive to the conveyors via the assemblies, in different positions of the assemblies associated with the relative movement thereof.

As will be seen, the two assemblies typically include driven timing pulleys on which the timing belts are entrained. Of advantage is the fact that only a single conveyor drive motor is required, there being driving timing pulleys rotatably carried by the frame and operatively connected with the drive motor to be driven thereby, and the timing belts respectively entrained on the driving timing pulleys. Shaft means and gearing may be operatively coupled between the drive motor and the driving timing pulleys, whereby one driving pulley is rotated clockwise, and the other driving pulley is rotated counterclockwise. Also the conveyors typically include endless belts having stretches extending in the direction of the wire at opposite sides thereof.

It is another object of the invention to locate the guide means to extend vertically so that the assemblies are vertically movable toward and away from one another, the driven and driving timing pulleys having horizontally parallel extending axes, the axis of each driving timing pulley spaced substantially horizontally from the axis of its associated driven timing pulley, whereby the timing belts accommodate to the relative movement of the assemblies toward and away from one another.

Yet another object is to provide secondary drive means on the frame means and coupled with the assemblies for effecting the relative movement thereof. In this regard, the secondary drive means is coupled with the assemblies via the guide means; the guide means may comprise an elongated element on which the assemblies are slidably mounted; and the elongated element may comprise a shaft rotatably mounted on the frame to be rotated by the secondary drive means, and structure carried on the shaft for controllably yieldably urging the assemblies toward one another.

A further object is the provision of nut structure in threadable engagement with the shaft, and spring means between the nut means and the assemblies to exert yieldable force against the assemblies, in directions toward the wire.

An additional object is to provide the conveyor means to include second upper and lower endless conveyors engageable with opposite sides of the wire, and spaced from the first upper and lower conveyors in the direction of wire travel, and wire cutter means located between the first conveyors and the second conveyors.

Also then includible are:

i) second upper and lower assemblies for carrying and controllably driving the second conveyors, ii) there being second frame means including second guide means on which the second assemblies are supported and guided for relative movement toward and away from one another, iii) there being second timing belts operatively connected with the second assemblies to transmit rotary drive to the second conveyors via the second assemblies, in different positions of those assemblies associated with the relative movement thereof.

These and other objects and advantages of the invention, as well as the details of an illustrative embodiment, will be more fully understood from the following specification and drawings, in which:

DETAILED DESCRIPTION

Figure 1:
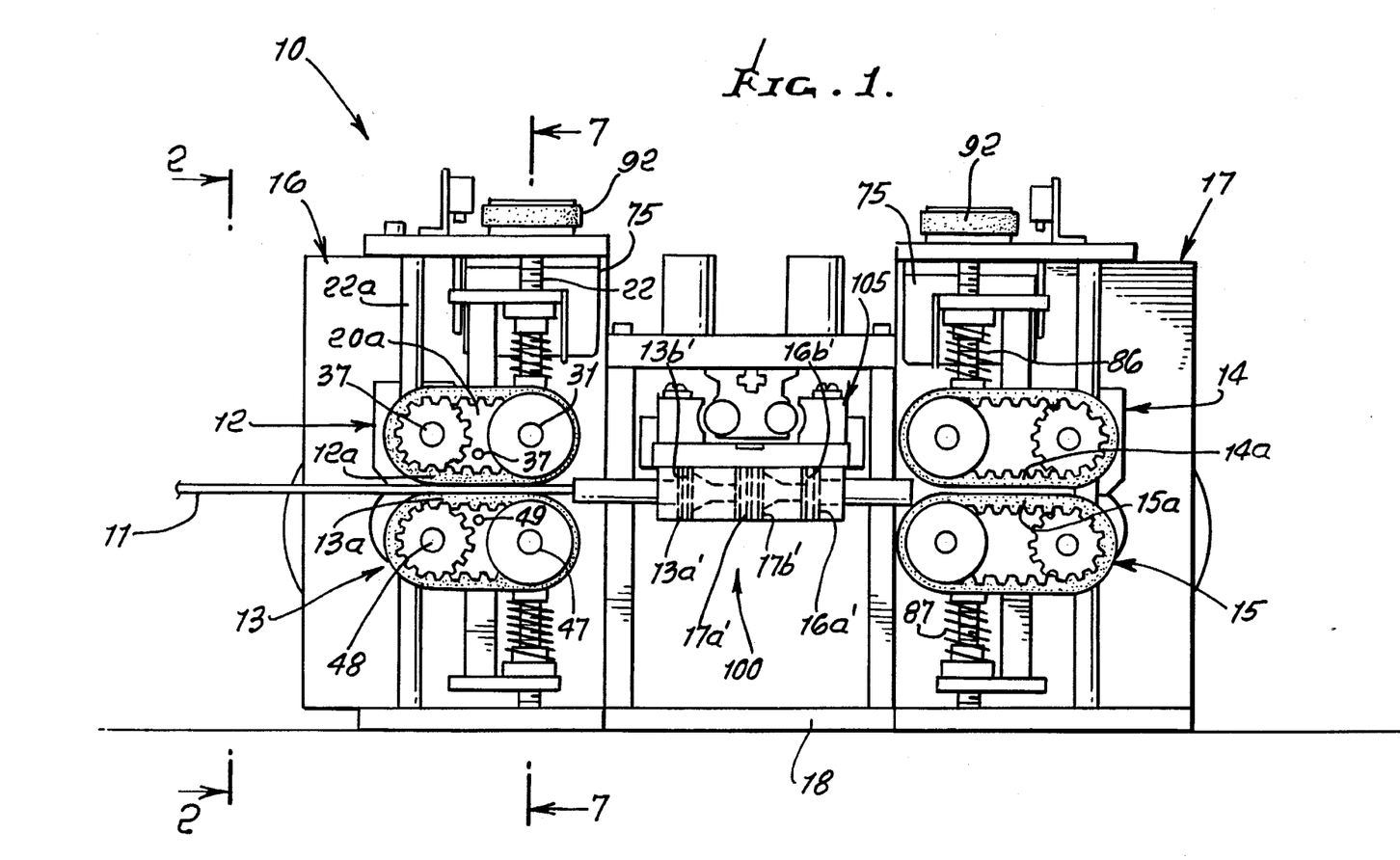
FIG. 1 is a side view elevation showing wire displacing and processing apparatus.

The illustrated apparatus 10 in FIG. 1 is used for processing wire or cable 11 moving from left to right under the control of conveyor means. As shown, the conveyor means includes first upper and lower endless conveyors 12 and 13 engageable with opposite sides (upper and lower) of the wire. The conveyor means may also include second upper and lower endless conveyors 14 and 15 engageable with upper and lower sides of the wire, as the wire, or a cut section thereof, travels rightwardly. The conveyors 12 and 13 operate together so that their belt stretches 12a and 13a engage and displace the wire rightwardly, or leftwardly; and likewise, conveyors 14 and 15 operate together so that their stretches 14a and 15a engage and displace wire or a cut section thereof rightwardly or leftwardly. Frames associated with the conveyors are indicated generally at 16 and 17, and a base for the frames at 18.

Figure 2:
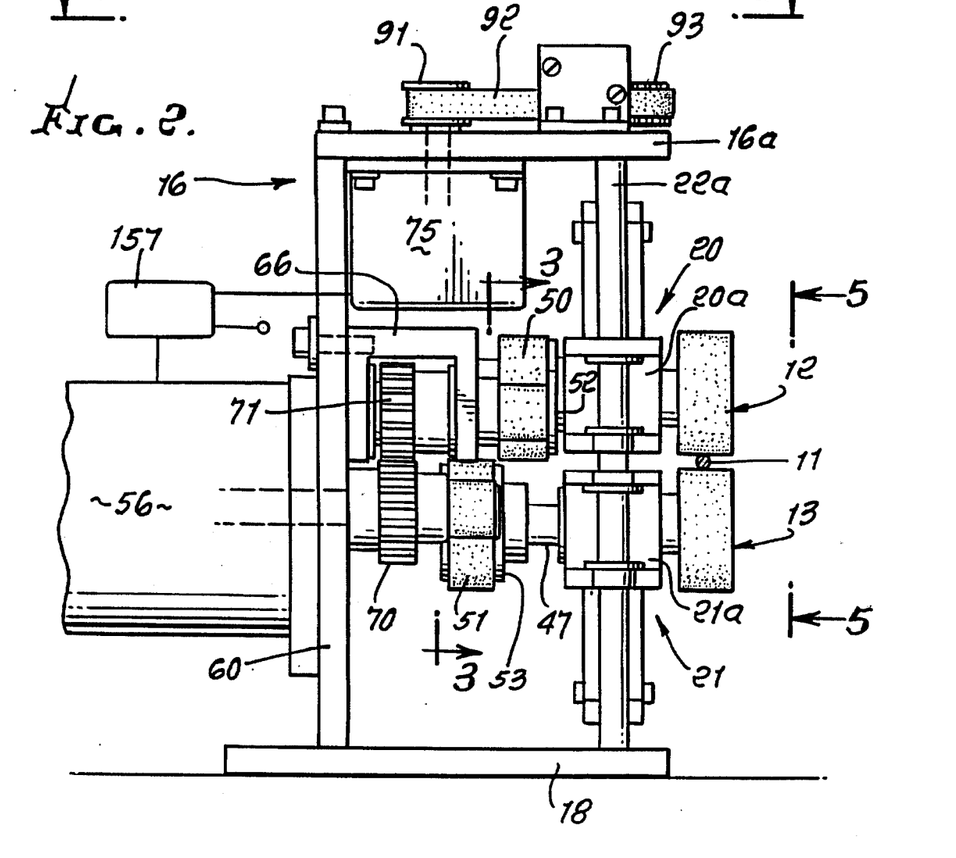
FIG. 2 is an enlarged elevation taken on lines 2—2 of FIG. 1.
Figure 4:
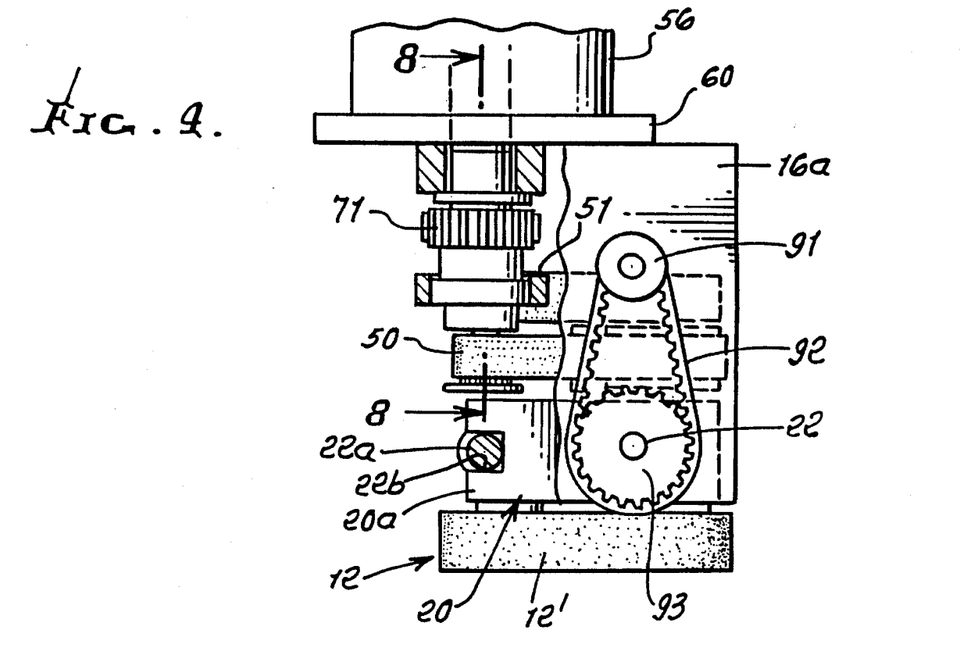
FIG. 4 is a plan view, partly broken away, taken on lines 4—4 of FIG. 2.

Referring now to FIG. 2, first upper and lower assemblies 20 and 21 are provided to respectively carry and controllably drive the first conveyors 12 and 13. The frame 16 includes an upper plate 16a; and a guide means for the assemblies 20 and 21 is provided in the form of a fixed shaft 22a and a rotary vertical shaft 22, both extending between 16a and the base 18. Shafts 22a and 22 are spaced apart as shown. See also FIGS. 4 and 7. Shaft 22a guides in slot 22b in a block 20a. The assemblies 20 and 21 include blocks 20a and 21a containing bores 25 and 26 to pass the shaft, sleeve bearings 27 and 28 being provided to enable guided up and down sliding of the blocks on the shaft.

Figures 6, 7, 8:
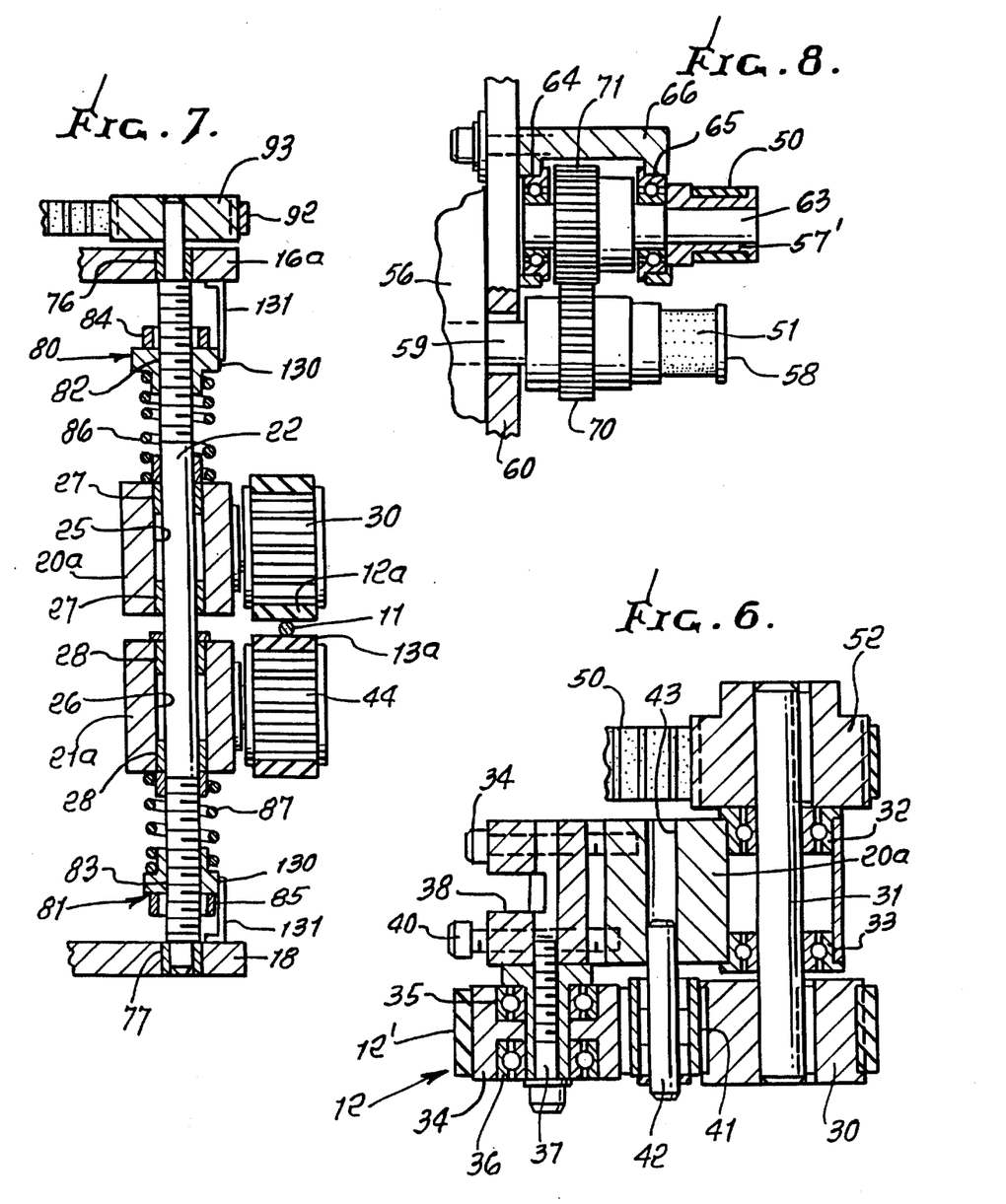
FIG. 6 is a plan view taken in section on lines 6—6 of FIG. 5.
FIG. 7 is a section taken in elevation on lines 7—7 of FIG. 1.
FIG. 8 is a fragmentary elevation taken on lines 8—8 of FIG. 4.

Conveyor 12 includes a driven sprocket 30 keyed to a drive shaft 31 extending horizontally normal to the direction of wire travel (see FIG. 6). Shaft 31 is mounted by bearings 32 and 33 mounted on block 20a. Conveyor 12 idler sprocket 34 rotates on bearings 35 and 36 supported by a shaft 37 in the form of a screw attached to sub-block 38. The latter is attached by fasteners 39 and 40 to block 20a. An additional toothed idler 41 is carried by a shaft 42 mounted in a bore 43 in block 20a. Block 38 is easily removed to permit change of belt 12'.

Figure 5:
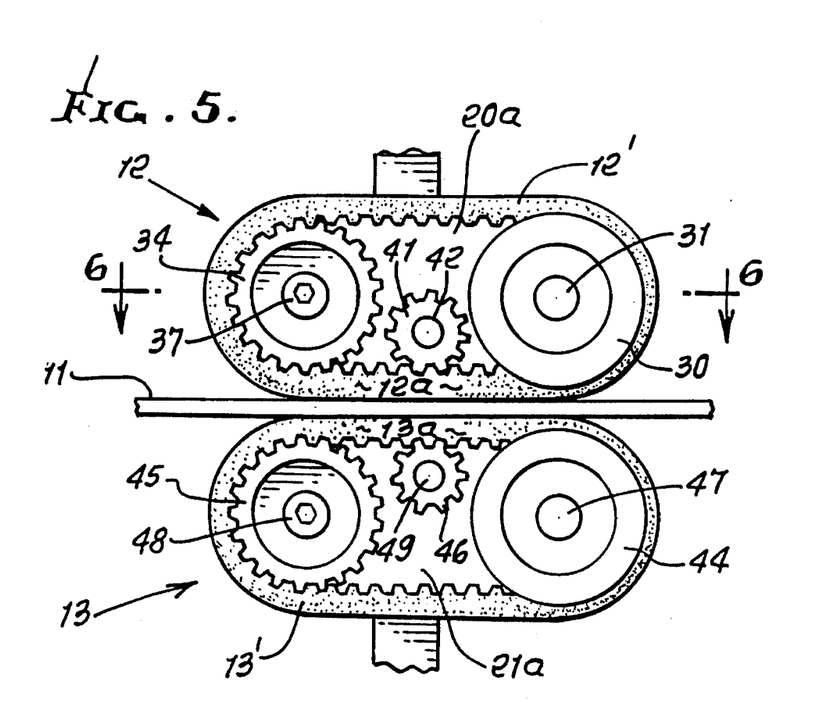
FIG. 5 is an elevation taken on lines 5—5 of FIG. 2.

Conveyor belt 12' is a timing belt entrained on 30, 34 and 41, as shown in FIG. 5. The lower conveyor 13 includes like or corresponding elements, indicated in FIG. 5 by toothed drive sprocket 44, idler sprocket 45, and idler sprocket 46. Lower belt 13' is entrained on 44, 45 and 46, as shown. A drive shaft to sprocket 44 is indicated at 47 in FIGS. 1 and 5; and shafts mounting 45 and 46 are indicated at 48 and 49. See also block 21a in FIG. 5. Thus, the upper and lower assemblies have generally the same construction. Sprockets 41 and 46 are omitted in FIG. 1, but their shafts 37 and 49 are indicated.

In accordance with an important feature of the invention, timing belts are operatively connected with the assemblies to transmit rotary drive to the conveyors via the assemblies, in different positions of the assemblies associated with relative up and down movement thereof.

Figure 3:
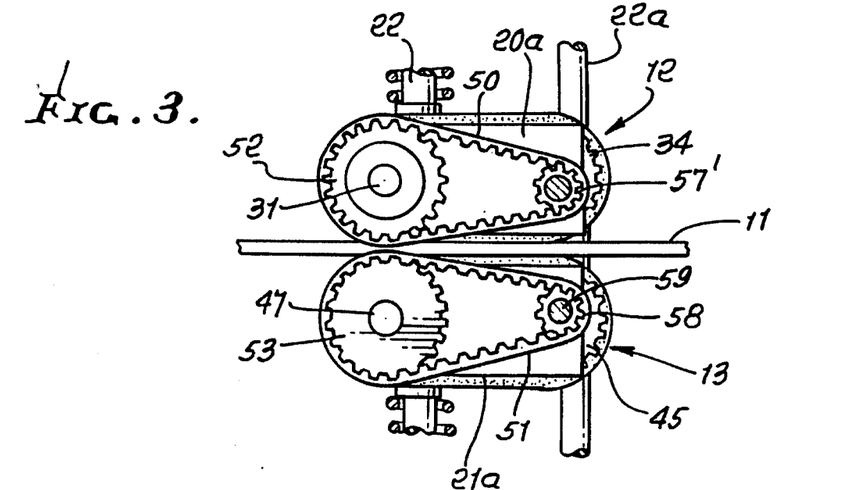
FIG. 3 is a section taken on lines 3—3 of FIG. 2.

Referring to FIG. 3, upper and lower timing belts are shown at 50 and 51, belt 50 entraining an upper assembly driven timing pulley or sprocket 52 on shaft 31; and belt 51 entraining a lower assembly driven timing pulley or sprocket 53 on shaft 47. See also the offset relation (in directions parallel to the shafts) of these belts 50 and 51 in FIG. 2, whereby a highly compact construction is achieved.

A single drive motor 56, electrically controlled by master controller 157, drives both drive belts 50 and 51. See in this regard drive sprockets 57 and 58 for the timing belts 50 and 51. Sprocket 58 is on a shaft 59 extending from the motor 56 (see FIG. 8) mounted to frame plate 60. Thus, drive sprocket 58 does not move up or down with associated lower conveyor 13. Sprocket 57 is on auxiliary shaft 63 parallel to shaft 59 but carried by bearings 64 and 65. The latter are in turn carried by frame structure 66 attached to plate 60. Thus, drive sprocket 57 does not move up and down with associated upper conveyor 12.

In this regard, it will be noted that the guide shaft 22 extends vertically so that the assemblies are vertically movable toward and away from one another, the driven and driving timing pulleys having horizontally parallel extending axes, the axis of each driving timing pulley spaced substantially horizontally from the axis of its associated driven timing pulley, whereby the timing belts accommodate to the relative movement of the assemblies toward and away from one another. A highly compact and integrated combination of elements is thereby achieved. Shaft 63 rotates counter to shaft 59, due to meshing gears 70 on shaft 59, and 71 on shaft 63, whereby the conveyor belts 12' and 13' are driven oppositely (in clockwise and counterclockwise relation respectively) and stretches 12a and 13a in the same direction, simultaneously.

Also provided is secondary drive means on the frame and coupled with the assemblies for effecting the vertical relative movement thereof. In the embodiment shown, the secondary drive means, as for example motor 75, located below plate 16a, is coupled with the assemblies 12 and 13 via the guide means in the form of the elongated and rotatable shaft element 22 on which the assemblies are slidably mounted, as referred to above. The shaft 22 is rotatably mounted to the frame, as via upper and lower bearings 76 and 77, as seen in FIG. 7. Motor coupling to shaft 22 includes driving pulley 91, timing belt 92, and driven pulley 93 mounted on 22 for driving the latter. Structure is carried by the shaft for controllably and yieldably urging the assemblies toward one another. As shown, that structure may advantageously take the form of nut means, as for example nuts 80 and 81, in threadable engagement with the shaft, as at thread locations 82 and 83 on the shaft. The threads are such that when the shaft is rotated in one direction, nut 80 moves downwardly and nut 81 moves upwardly, relative to the shaft. When the shaft is rotated in the opposite direction, the nuts move up to engage plates 84 and 85 to lift the upper conveyor and lower the lower conveyor, opening up the gap between the conveyors.

Spring means, as for example compression springs 86 and 87, between the nuts and the blocks 20a and 21a, exert yieldable and controllable force against the assemblies 12 and 13 in directions yieldably urging them toward one another, and which in turn exert that force on the wire, via the conveyor belts 12' and 13'. The extent of rotation of the shaft 22, as controlled by stepping motor 75, determines the gripping force exerted on the wire, and that force may be varied in accordance with the wire size and surface texture. The master controller 57 controls motor 75. Thus, any size wire or cable can be accurately engaged or driven forwardly or reversely, for processing at the work station, indicated at 100.

The structure driving and controlling the forward or second conveyors 14 and 15 is the same as that described for conveyors 12 and 13, the work station 100 located between those pairs of conveyors 12 and 13, and 14 and 15. Cutter blades and their operation may take the form, as described in U.S. Pat. No. 5,199,328, incorporated herein by reference. See blades indicated at 13a' and 13b', 16a' and 16b', and 17a' and 17b', in FIG. 1, and corresponding to blades 13a, 13b, 16a, 16b, 17a, and 17b, described in that prior patent. Other forms of blades and blade operating mechanism 105 may also be used.

Accordingly, the wire drive is usable in conjunction with cutter blades located for movement toward and away from the endwise axis, and with blade drive means operatively connected with the blades to displace them toward and away from the endwise axis, to sever the cable or the wire, and also to strip insulation therefrom. Drive mechanism for the blade operating mechanism 105 may be controlled by controller 57.

As seen from the above, apparatus embodying the invention embodies:

a) conveyor means for displacing the wire endwise, the conveyor means including first upper and lower endless conveyors engageable with opposite sides of the wire, b) and first upper and lower assemblies for carrying and controllably driving the conveyors, c) there being frame means including guide means on which the assemblies are supported and guided for relative movement toward and away from one another, d) there being timing belts operatively connected with the assemblies to transmit rotary drive to the conveyors via the assemblies, in different positions of the assemblies associated with the relative movement thereof.

The method of operating the apparatus includes the steps:

i) adjusting the relative positions of the first and second assemblies to open up a wire-receiving space between the upper and lower conveyors, ii) then closing the conveyors toward one another and feeding a wire between the conveyors so that the conveyors engage opposite sides of the wire, iii) then advancing the conveyors by operation of the timing belts, iv) then processing the wire being advanced by the conveyors after the wire advances beyond the conveyors.

Referring again to FIG. 7, means is provided to include springs positioned to exert yieldable force on the assemblies, the nut elements 80 and 81 having threaded engagement with the second guide 22 to controllably tension the respective springs, in response to controlled rotation of the second guide. Such means may include shoulders such as flats 130 on each nut and spaced about the shaft axis. Holders 131 engage the flats and are carried by the frame, to hold the nuts against rotation. Each holder may be moved (deflected) away from a flat, to allow selective or adjustable rotation of the nut, whereby the spring tension associated with that nut can be adjusted. Thus, by increasing the tension in the upper spring, the two conveyors can be lowered, and vice versa; and by increasing the tension in the lower spring, the two conveyors can be raised. Thus, the wire center position between the conveyors can be raised or lowered, to accommodate wire feed locations.

In FIG. 7, the drive 93 may comprise a hand wheel instead of (or in addition to) being motor driven, for enhanced control.

The described timing belt driven apparatus eliminates backlash that would otherwise be associated with gears, whereby very accurate control of wire advancement and retraction is achieved. Thus, the drive motor for the conveyors is reversible and may be a step motor.

Accordingly, the invention enables different diameter wires to be handled and to have the same endwise travel center line, as for feeding to wire cutting and stripping blades, and associated apparatus, which is a very desirable feature or result. Very simple, effective, anti-backlash means is provided by the invention, to achieve these objectives.

In addition, the present invention enables wire to be advanced to the cut (cut blade) position, and then repositioned (after cutting) axially along a fixed and predetermined travel centerline. This is very desirable, and required, for accurate and consistent handling or processing of wires of different diameters or sizes. It also enables simple, initial wire introduction into the apparatus by either of two methods or techniques, as follows:

In the first such method (method A), the primary conveyors at the initial feed side of the cutter and stripper blades are opened away from the wire travel axis, and the wire end is placed within the input wire primary guide funnel 280. The conveyors are then closed toward one another to cause belt stretches 12a and 13a to grip the wire. The conveyors are then operated to advance the wire sufficiently to feed the forwardmost extent of the wire past the cutter, through secondary guide funnel 281 and associated tube 281a, and into engagement with belts 14a and 15a of secondary conveyors 14 and 15. The wire is then cut by the cutter blades and the forward cut-off section is driven out of the apparatus by operation of conveyors 14 and 15. The forward tip of the remaining wire, at the cutter blade location, is then at a known position to enable accurate subsequent processing of the remaining wire, under the control of a programmable master control.

In the second such method (method B), the primary conveyors 12 and 13 remain closed, and the forward end of the wire to be processed is held lightly against the entrance at 282 formed by the closed together belt stretches 12a and 13a.

The conveyors 12 and 13 are then operated to advance the wire between stretches 12a and 13a, then past the processing cutters (stripping and severing), then through the funnel 281 and tube 281c, and into engagement with secondary conveyor belts 14a and 15a at the feed entrance formed therebetween. The rest of the method is the same as above in method A.

The above methods A and B are made possible by virtue of maintenance of a fixed axial travel path of the wire, as referred to above, and by virtue of reduction of "backlash" to negligible amount, if any. The latter is made possible by the use of timing belts in the conveyor drives and in the provision of the single drive for both cutting and severing, as referred to in FIGS. 10–13. Prior machines required mechanical adjustment or changes in equipment in order to handle wires of different sizes. For example, in prior machines, wire travel centerlines changed, for wires of different sizes.

In wire processing, the wire end positioned at the cut blade position is advanced by the conveyors by a desired wire length amount. The wire is then cut to form a cut wire section. That section is then controllably moved axially forward and backward to enable sheathing stripping blades to penetrate the sheathing to selected depth near opposite ends of the cut section. Wire movement axially then effects removal of cut sheathing slugs. Very low backlash in wire drives (to the conveyors) is required for highly accurate cut wire section length determination, and for accurate stripping slug length determination, for wires of different sizes, while the wire is kept on a predetermined, fixed, axial, travel path.

Wires of outer diameter between about 0.030 inches up to about 0.25 inches may be advanced along the same axis and processed.

I claim:

1. In apparatus for processing wire, the combination comprising:

a) conveyor means for displacing the wire endwise, said conveyor means including first upper and lower endless conveyors engageable with opposite sides of the wire, b) and first upper and lower assemblies for carrying and controllably driving said conveyors, c) there being frame means including guide means on which said assemblies are supported and guided for movement toward and away from one another, d) there being timing belts operatively connected with said assemblies to transmit rotary drive to said conveyors via said assemblies, in different positions of the assemblies associated with said relative movement thereof, e) said guide means including
   one elongated guide which is fixed relative to said frame means
   a second elongated guide extending parallel to said one guide, said second elongated guide defining an axis of rotation about which the second guide is rotatable
   said second guide yieldably coupled to said assemblies to increasingly urge said assemblies toward the wire in response to said rotation of said second guide, f) there being springs positioned to exert yieldable force on said assemblies, and nuts having threaded engagement with said second guide to controllably tension the respective springs, in response to controlled rotation of the second guide, g) there being means for allowing independent adjusting rotation of the nuts on the second guide to selectively and adjustably tension the springs, h) and including shoulders on each nut spaced about the axis of the second guide, and holders movable into engagement and disengagement with said shoulders.

2. The combination of claim 1 wherein said assemblies include driven timing pulleys on which said timing belts are entrained.

3. The combination of claim 2 including a first drive motor, driving timing pulleys rotatably carried by the frame and operatively connected with the drive motor to be driven thereby, and said timing belts respectively entrained on said driving timing pulleys.

4. The combination of claim 1 wherein said guide means extends vertically so that said assemblies are vertically movable toward and away from one another, said driven and driving timing pulleys having parallel extending axes, the axis of each driving timing pulley spaced substantially horizontally from the axis of its associated driven timing pulley, whereby said timing belts accommodate to said relative movement of the assemblies toward and away from one another.

5. The combination of claim 1 including shaft means and gearing operatively coupled between said drive motor and said driving timing pulleys, whereby one driving pulley is rotated clockwise, and the other driving pulley is rotated counterclockwise.

6. The combination of claim 1 including shafts for said driving and driven pulleys, and wherein said timing belts and said driving and driven pulleys and the shafts are the only means to transmit drive from said first drive motor to said conveyor means.

7. The combination of claim 1 including secondary drive means on the frame means and coupled with said assemblies for effecting said relative movement thereof.

8. The combination of claim 1 wherein said secondary drive means is coupled with said assemblies via said guide means.

9. The combination of claim 8 wherein said guide means comprises an elongated element on which said assemblies are slidably mounted.

10. The combination of claim 9 wherein said element comprises a shaft rotatably mounted on the frame to be rotated by said secondary drive means, and structure carried on the shaft for controllably yieldably urging said assemblies toward one another.

11. The combination of claim 10 wherein said structure comprises urging means in cooperative engagement with the shaft, and spring means between the urging means and said assemblies to exert yieldable force against said assemblies, in opposite directions toward the wire.

12. The combination of claim 8 wherein said secondary drive means comprises one of the following:

a motor drive a manually rotatable drive.

13. The combination of claim 1 including secondary drive means including a second motor and coupled with said assemblies for effecting said relative movement thereof, and computer control means for first operating said second motor to adjust the position of said upper and lower conveyors, and for then operating the first motor to advance said conveyors.

14. In apparatus for processing wire, the combination comprising:

a) conveyor means for displacing the wire endwise, said conveyor means including first upper and lower endless conveyors engageable with opposite sides of the wire, b) and first upper and lower assemblies for carrying and controllably driving said conveyors, c) there being frame means including guide means on which said assemblies are supported and guided for movement toward and away from one another, d) there being timing belts operatively connected with said assemblies to transmit rotary drive to said conveyors via said assemblies, in different positions of the assemblies associated with said relative movement thereof, e) said assemblies including driven timing pulleys on which said timing belts are entrained, f) there being a first drive motor, driving timing pulleys rotatably carried by the frame and operatively connected with the first drive motor to be driven thereby, and said timing belts respectively entrained on said driving timing pulleys, g) and including secondary drive means including a second motor and coupled with said assemblies for effecting said relative movement thereof, and computer control means for first operating said second motor to adjust the position of said upper and lower conveyors, and for then operating the first motor to advance said conveyors.

15. The combination of claim 1 wherein said guide means includes:

one elongated guide which is fixed relative to said frame means a second elongated guide extending parallel to said one guide, said second elongated guide defining an axis of rotation about which the secondary guide is rotatable said second guide yieldably coupled to said assemblies to increasingly urge said assemblies toward the wire in response to said rotation of said second guide.

16. The combination of claim 15 including springs positioned to exert yieldable force on said assemblies, and nuts having threaded engagement with said second guide to controllably tension the respective springs, in response to controlled rotation of the second guide.

17. The combination of claim 16 including means for allowing independent adjusting rotation of the nuts on the second guide to selectively and adjustably tension the springs.

18. The combination of claim 17 including shoulders on each nut spaced about the axis of the second guide, and holders movable into engagement and disengagement with said shoulders.

19. The combination of claim 1 wherein the wire is displaceable by the conveyors along an endwise axis, and including cutter blades located for movement toward and away from said axis, and blade drive means operatively connected with the blades to displace them toward and away from said axis, to controllably sever the wire.

20. The combination of claim 1 wherein said conveyors include endless belts having stretches extending in the direction of the wire at opposite sides thereof.

21. The combination of claim 1 wherein said endless conveyors also comprise timing belts.

22. The combination of claim 21 wherein said conveyors include two spaced upper rotors on which the upper endless conveyor is entrained, and two spaced lower rotors on which the lower endless conveyor is entrained, the upper assembly carrying said two upper rotary and the upper conveyor, and the lower assembly carrying the two lower rotors and the lower conveyor.

23. The combination of claim 1 wherein the conveyor means includes second upper and lower endless conveyors engageable with opposite sides of the wire, and spaced from said first upper and lower conveyors in the direction of wire travel, and wire cutter means located between said first conveyors and said second conveyors.

24. The combination of claim 23 including i) second upper and lower assemblies for carrying and controllably driving said second conveyors, ii) there being second frame means including guide means on which said second assemblies are supported and guided for relative movement toward and away from one another, iii) there being second timing belts operatively connected with said second assemblies to transmit rotary drive to said second conveyors via said second assemblies, in different positions of the second assemblies associated with said relative movement thereof.

25. The combination of claim 1 wherein there are only two of said timing belts.

* * * * *

UNITED STATES PATENT AND TRADEMARK OFFICE
CERTIFICATE OF CORRECTION

PATENT NO.   : 5,456,148
DATED        : October 10, 1995
INVENTOR(S)  : Jack L. Hoffa It is certified that error appears in the above-identified patent and that said Letters Patent is hereby corrected as shown below:

Title page,
Item [63], Related U.S. Application Data, should read:
-- Continuation-in-part of Ser.No. 22,981, Feb. 25, 1993, Pat. No. 5,375, 485, which is a continuation-in-part of Ser. No. 857,972, Mar. 26, 1992, Pat. No. 5,293,683, which is a division of Ser.No. 765,986, Sep. 26, 1991, Pat. No. 5,253,555, which is a continuation-in-part of Ser. No. 659,557, Feb. 22, 1991, abandoned, which is a continuation-in-part of Ser. No. 611,057, Nov. 9, 1990, Pat. No. 5,146,673. --

Column 1,
Line 8, after "5,293,683", insert -- which is a division of Ser. No. 765,986, Sep. 26, 1991, Pat No. 5,253,555 --

Signed and Sealed this

Sixteenth Day of November, 2004

JON W. DUDAS
*Director of the United States Patent and Trademark Office*